United States Patent
Rust et al.

(10) Patent No.: US 12,163,440 B2
(45) Date of Patent: Dec. 10, 2024

(54) NACELLE INLET ASSEMBLY WITH COMPOSITE LIPSKIN

(71) Applicant: THE BOEING COMPANY, Arlington, VA (US)

(72) Inventors: Charles William Rust, Seattle, WA (US); John Alfred Weidler, III, Lynnwood, WA (US); John Henry Moselage, III, Seattle, WA (US); Timothy James Wheeler, London (GB)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 18/165,461

(22) Filed: Feb. 7, 2023

(65) Prior Publication Data
US 2024/0018883 A1   Jan. 18, 2024

Related U.S. Application Data

(60) Provisional application No. 63/368,547, filed on Jul. 15, 2022.

(51) Int. Cl.
*F01D 25/02* (2006.01)
*B64D 15/06* (2006.01)
(Continued)

(52) U.S. Cl.
CPC .............. *F01D 25/26* (2013.01); *B64D 15/06* (2013.01); *B64D 29/06* (2013.01); *B64F 5/10* (2017.01);
(Continued)

(58) Field of Classification Search
CPC . F01D 25/26; F01D 25/02; B64F 5/10; B64D 15/06; B64D 29/06; F05D 2230/41;
(Continued)

(56) References Cited

U.S. PATENT DOCUMENTS

| | | | |
|---|---|---|---|
| 4,021,008 A * | 5/1977 | Eichenauer | B64D 15/14 244/134 D |
| 4,434,201 A | 2/1984 | Humphreys et al. | |

(Continued)

FOREIGN PATENT DOCUMENTS

| | | |
|---|---|---|
| EP | 2112353 B1 | 9/2011 |
| EP | 2219947 B1 | 2/2013 |
| FR | 2697495 A1 | 7/1995 |

OTHER PUBLICATIONS

Extended European Search Report received for related EP App.: 23185321 dated Nov. 10, 2023 (12 pages).

*Primary Examiner* — David E Sosnowski
*Assistant Examiner* — Theodore C Ribadeneyra
(74) *Attorney, Agent, or Firm* — The Small Patent Law Group LLC; Philip S. Hof (57) ABSTRACT

An inlet assembly of a nacelle includes an inlet cowl. The inlet cowl includes a lipskin that has a front section which defines the leading edge of the inlet cowl. The front section includes a composite panel and a metallic coating disposed along an exterior surface of the composite panel to protect the composite panel from damage. The lipskin defines perforations that penetrate through the composite panel and the metallic coating at the front section to convey a liquid through a thickness of the lipskin onto an exterior surface of the inlet cowl.

20 Claims, 8 Drawing Sheets

(51) Int. Cl.
  *B64D 29/06*   (2006.01)
  *B64F 5/10*    (2017.01)
  *F01D 25/26*   (2006.01)

(52) U.S. Cl.
  CPC .......... *F01D 25/02* (2013.01); *F05D 2230/41* (2013.01); *F05D 2230/90* (2013.01); *F05D 2240/14* (2013.01); *F05D 2300/17* (2013.01); *F05D 2300/43* (2013.01); *F05D 2300/603* (2013.01)

(58) Field of Classification Search
  CPC ............. F05D 2230/90; F05D 2240/14; F05D 2300/17; F05D 2300/43; F05D 2300/603
  See application file for complete search history.

(56) References Cited

U.S. PATENT DOCUMENTS

| | | | |
|---|---|---|---|
| 4,749,150 A | 6/1988 | Rose et al. | |
| 5,011,098 A * | 4/1991 | McLaren | B64D 27/14 |
| | | | 244/134 B |
| 5,944,287 A | 8/1999 | Rodgers | |
| 7,047,725 B2 | 5/2006 | Moe et al. | |
| 7,291,815 B2 | 11/2007 | Hubert et al. | |
| 7,588,212 B2 | 9/2009 | Moe et al. | |
| 7,681,838 B2 | 3/2010 | Layland et al. | |
| 7,923,668 B2 | 4/2011 | Layland et al. | |
| 8,919,494 B2 | 12/2014 | Burkett et al. | |
| 9,511,562 B2 | 12/2016 | Kruckenberg et al. | |
| 9,732,677 B1 | 8/2017 | Chien et al. | |
| 9,771,866 B2 | 9/2017 | Pujar et al. | |
| 10,738,738 B2 | 8/2020 | Lu et al. | |
| 11,125,157 B2 | 9/2021 | Thomas et al. | |
| 11,174,815 B2 | 11/2021 | Soria | |
| 11,261,786 B2 | 3/2022 | Pierick et al. | |
| 2009/0092844 A1 * | 4/2009 | Ware | B64D 45/02 |
| | | | 427/404 |
| 2015/0285144 A1 * | 10/2015 | Todorovic | F02C 7/045 |
| | | | 137/15.1 |
| 2016/0107746 A1 * | 4/2016 | Tiwari | B23K 26/382 |
| | | | 219/121.72 |
| 2016/0159488 A1 * | 6/2016 | Roach | B64D 29/00 |
| | | | 427/443.1 |
| 2016/0215700 A1 | 7/2016 | Yu et al. | |
| 2016/0305321 A1 * | 10/2016 | Pujar | B64D 29/00 |
| 2019/0093557 A1 | 3/2019 | Thomas et al. | |

* cited by examiner

NACELLE INLET ASSEMBLY WITH COMPOSITE LIPSKIN

CROSS-REFERENCE TO RELATED APPLICATIONS

This application is a non-provisional conversion of, and claims priority to, U.S. Patent Application No. 63/368,547, filed Jul. 15, 2022, which is hereby incorporated by reference in its entirety.

FIELD OF THE DISCLOSURE

Embodiments of the present disclosure generally relate to the inlet section of a nacelle, such as an engine nacelle on an aircraft.

BACKGROUND

Some types of aircraft include engines attached to the wings, fuselage, or tail of the aircraft. The engines have nacelles which are outer casings for the engine components. A nacelle includes an inlet section at a leading or front end of the nacelle. The nacelle may also include a fan cowl, a thrust reverser section, and an aft fairing section located behind the inlet section along a longitudinal length of the nacelle. The inlet section has an inner barrel that defines an air inlet duct for directing air to the fan and downstream components of the engine. The inner barrel may have an acoustic panel to facilitate reducing noise created by the fan and a compressor of the engine.

There are several advantages associated with a compact nacelle. For example, shortening the nacelle along the longitudinal length may improve fuel burn and reduce drag, weight, and material costs. However, shortening the inlet section undesirably results in less available volume and surface area in which to integrate noise treatment and anti-ice systems. For example, there may be less space available within the inlet section for the acoustic panel, requiring a shorter acoustic panel. Some known anti-ice systems direct a stream of hot engine bleed air into a channel of the inlet section defined between a front end of the inlet and a bulkhead within the inlet. The hot air stream heats the leading edge of the inlet section to melt and/or prevent the formation of ice on the exterior surface of the inlet section. This pneumatic, bleed air-based anti-ice system has several drawbacks, including relatively high complexity (e.g., requiring valves and conduits to control the blead air, as well as bulkheads in the inlet), reduced fuel efficiency (e.g., fuel economy) due to the use of bleed air for heating rather than propulsion, lower maximum thrust level able to be generated by the engine, and the like.

SUMMARY OF THE DISCLOSURE

A need exists for a nacelle inlet assembly and method of assembly that solves or at least mitigates volume constraint issues associated with a shorter, more compact nacelle, enabling the aircraft to achieve greater fuel efficiency.

Certain embodiments of the present disclosure provide an inlet assembly of a nacelle. The inlet assembly includes an inlet cowl. The inlet cowl includes a lipskin that has a front section which defines a leading edge of the inlet cowl. The front section includes a composite panel and a metallic coating disposed along an exterior surface of the composite panel to protect the composite panel from damage. The lipskin defines perforations that penetrate through the composite panel and the metallic coating at the front section to convey a liquid through a thickness of the lipskin onto an exterior surface of the inlet cowl.

Certain embodiments of the present disclosure provide a method (e.g., for forming a nacelle inlet assembly). The method includes forming an inlet cowl that includes a leading edge. The inlet cowl is formed by applying a carbon fiber reinforced polymer (CFRP) material on a curved tool. The CFRP material is cured to form a composite panel of a lipskin. The lipskin includes a front section that defines the leading edge of the inlet cowl. The inlet cowl is formed by applying a metallic coating along an exterior surface of the composite panel to protect the composite panel from damage, and by forming perforations that continuously extend through both the composite panel and the metallic coating. The perforations are located along the front section of the lipskin and are configured to deliver a liquid through a thickness of the lipskin onto an exterior surface of the inlet cowl.

Certain embodiments of the present disclosure provide an inlet assembly of a nacelle. The inlet assembly includes an inlet cowl and a fluid ice protection system (FIPS). The inlet cowl includes a leading edge, an inner barrel portion, and an outer barrel portion. The inlet cowl has a lipskin and an acoustic panel. The lipskin includes a front section which defines the leading edge of the inlet cowl. The front section includes a composite panel and a metallic coating disposed along an exterior surface of the composite panel to protect the composite panel from damage. The lipskin defines perforations that penetrate through the composite panel and the metallic coating at the front section to convey a liquid through a thickness of the lipskin onto an exterior surface of the inlet cowl. The acoustic panel is coupled to the lipskin and extends along the inner barrel portion. The FIPS includes a plenum back wall affixed to an interior surface of the composite panel along the front section to define a plenum between the interior surface and a front surface of the plenum back wall. The FIPS includes a fluid delivery conduit coupled to the plenum back wall and configured to supply an anti-ice liquid into the plenum through an aperture in the plenum back wall for the anti-ice liquid in the plenum to penetrate through the perforations onto an exterior surface of the inlet cowl.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

This invention was made with UK Government support under 22482—UK Aerospace Research and Technology Programme. The UK Government may have certain rights in this invention.

Certain embodiments of the present disclosure provide systems and methods for providing an inlet assembly that has a short inlet architecture. The inlet assembly may be incorporated into a compact, short nacelle to achieve greater fuel efficiency relative to a longer nacelle. In one or more embodiments, the inlet assembly includes an inlet cowl that has a lipskin. The lipskin includes a composite panel with a metallic coating along an exterior surface of the composite panel. The metallic coating provides an erosion shield to protect against leading edge damage. For example, the metallic coating is exposed along the leading edge to sunlight, wind, moisture, debris, birds, and/or the like, and protects the composite panel from such elements. In an embodiment, the composite panel is or includes carbon fiber. For example, the composite panel may have a carbon fiber reinforced polymer (CFRP) material.

The inlet assembly according to an embodiment includes a fluid ice protection system (FIPS) that is operably connected to the inlet cowl. For example, the FIPS may supply an anti-ice liquid to an interior surface of the lipskin. The anti-ice liquid may be a freezing point depression compound, such as a glycol-based solution. The lipskin of the inlet cowl may include perforations (e.g., holes) that extend through the thickness of the lipskin, such that each perforation penetrates through both the composite panel and the metallic coating. The perforations may be relatively small and may be laser-formed. For example, the perforations may be microscopic (e.g., with micron scale diameters). The anti-ice liquid may weep through the perforations onto the exterior surface of the metallic coating. The liquid prevents the formation of ice (and removes any ice already present) along the inlet, which can be detrimental to flight and engine performance. The FIPS may include a plenum back wall that is coupled to the interior surface of the lipskin to define a plenum (e.g., cavity). The anti-ice liquid is supplied to the plenum through one or more conduits that extend from a reservoir remote from the inlet cowl. The FIPS may include one or more membranes within the plenum that absorb and distribute the anti-ice liquid to the perforations. For example, the membrane(s) may extend across and cover all or a majority of the perforations, such that the anti-ice fluid enters the perforations from the membrane(s).

In an embodiment, the lipskin has an outer barrel portion that extends aft for a longer length than at least some conventional inlet cowls. For example, the outer barrel portion of the lipskin may extend aft to an interface with the fan cowl. By extending the lipskin all the way to the fan cowl along the outer side, the inlet cowl described herein may lack a discrete composite outer barrel that is coupled to the lipskin. The composite panel with metallic coating may extend from the leading edge along the outer barrel portion to the interface with the fan cowl. In addition to reducing assembly steps and materials by omitting a separate outer barrel panel, providing a single, unitary structure along the outer length of the inlet may beneficially enlarge the region of laminar air flow along the inlet. For example, the exterior surface of the inlet cowl may be smooth and free of seams from the leading edge along the outer barrel portion to the end of the lipskin, which results in a low likelihood of turbulent air flow along the outer barrel portion. At least some conventional inlet cowls may include seams at interfaces between the lipskin and the outer barrel panel. The seams increase turbulence of the air flow, which is detrimental to flight and engine performance. The inlet cowl described herein may provide an extended natural laminar flow surface, resulting in improved aerodynamic performance. The inlet cowl may include support frames within an interior of the inlet cowl to mechanically support the extended length of the lipskin and withstand forces exerted on the exterior of the lipskin. One or more of the support frames may be open truss-like structures. Optionally, some of the support frames may extend longitudinally, and others of the support frames may extend circumferentially. The support frames may be located aft of the plenum back wall of the FIPS.

Figure 1:
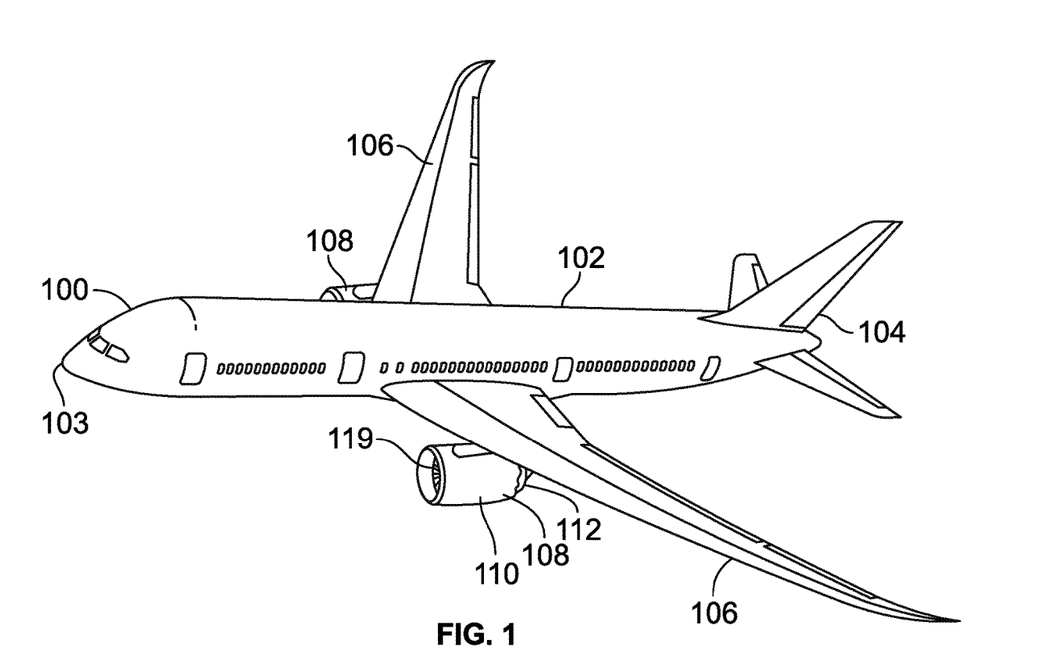
FIG. 1 is a perspective illustration of an aircraft.

Referring now to the drawings, which illustrate various embodiments of the present disclosure, FIG. 1 is a perspective illustration of an aircraft 100. The aircraft 100 may include a fuselage 102 extending from a nose 103 to an empennage 104. The empennage 104 may include one or more tail surfaces for directional control of the aircraft 100. The aircraft 100 includes a pair of wings 106 extending from the fuselage 102. The aircraft 100 includes one or more propulsion systems 108 which are optionally supported by the wings 106. In an embodiment, each propulsion system 108 may include or represent a gas turbine engine 119 surrounded by a nacelle 110. In an alternative embodiment, one or more of the propulsion systems 108 may include motor-driven rotors surrounded by the nacelle 110 instead of a gas turbine engine. For example, the motor of such propulsion systems 108 may be powered by electrical energy supplied by an onboard battery system and/or an onboard electrical energy generation system. The nacelle 110 may have an exhaust nozzle 112 (e.g., a primary exhaust nozzle and a fan nozzle) at an aft end of the propulsion system 108.

Figure 2:
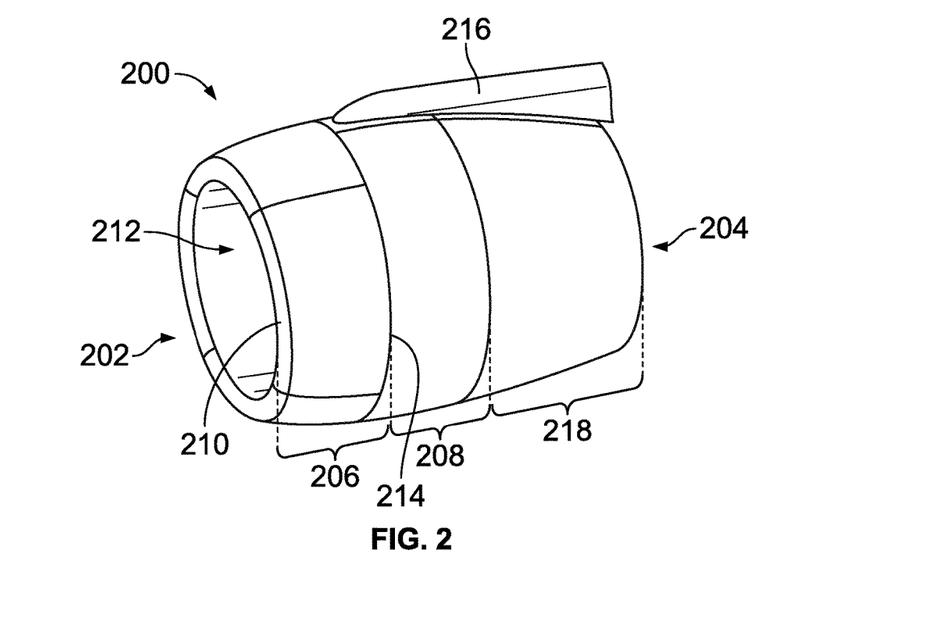
FIG. 2 illustrates an embodiment of a nacelle of a propulsion system of an aircraft according to an embodiment.

FIG. 2 illustrates an embodiment of a nacelle 200 of a propulsion system of an aircraft according to an embodiment. The nacelle 200 may be one of the nacelles 110 of the propulsion systems 108 shown in FIG. 1. The nacelle 200 extends a length from a front end 202 of the nacelle 200 to an aft end 204 of the nacelle 200 (opposite the front end 202). The nacelle 200 may include an inlet cowl 206 and a fan cowl 208. The inlet cowl 206 defines a leading edge 210 of the nacelle 200 at the front end 202, to direct air into a core 212 of the nacelle 200. The fan cowl 208 is aft of the inlet cowl 206 and is connected to the inlet cowl 206. The fan cowl 208 may connect to and extend from an aft edge 214 of the inlet cowl 206. The fan cowl 208 may surround one or more fans mounted at a forward end of the engine within the core 212.

The nacelle 200 may include a mount 216 for securing the nacelle 200 and the rotary components held by the nacelle 200 to the aircraft. The mount 216 may be a pylon. The nacelle 200 includes at least one aft section 218 that is disposed aft of the fan cowl 208 along the length of the nacelle 200. The aft section(s) 218 may surround engine components such as a compressor, combustion chamber (or combustor), and turbine. The aft section(s) 218 may include or represent a thrust reverser, aft fairing, or the like. The aft section(s) 218 may define the aft end 204 and an aft nozzle through which air and exhaust products are emitted from the propulsion system.

Figure 3:
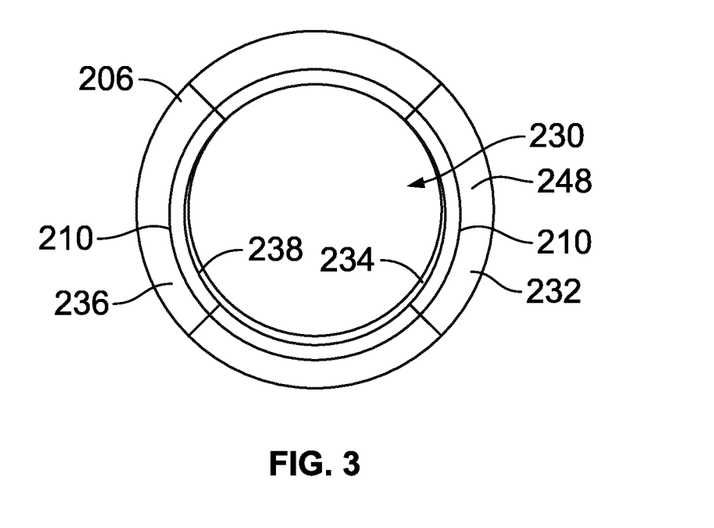
FIG. 3 is a front view of an inlet cowl of the nacelle shown in FIG. 2.
Figure 4:
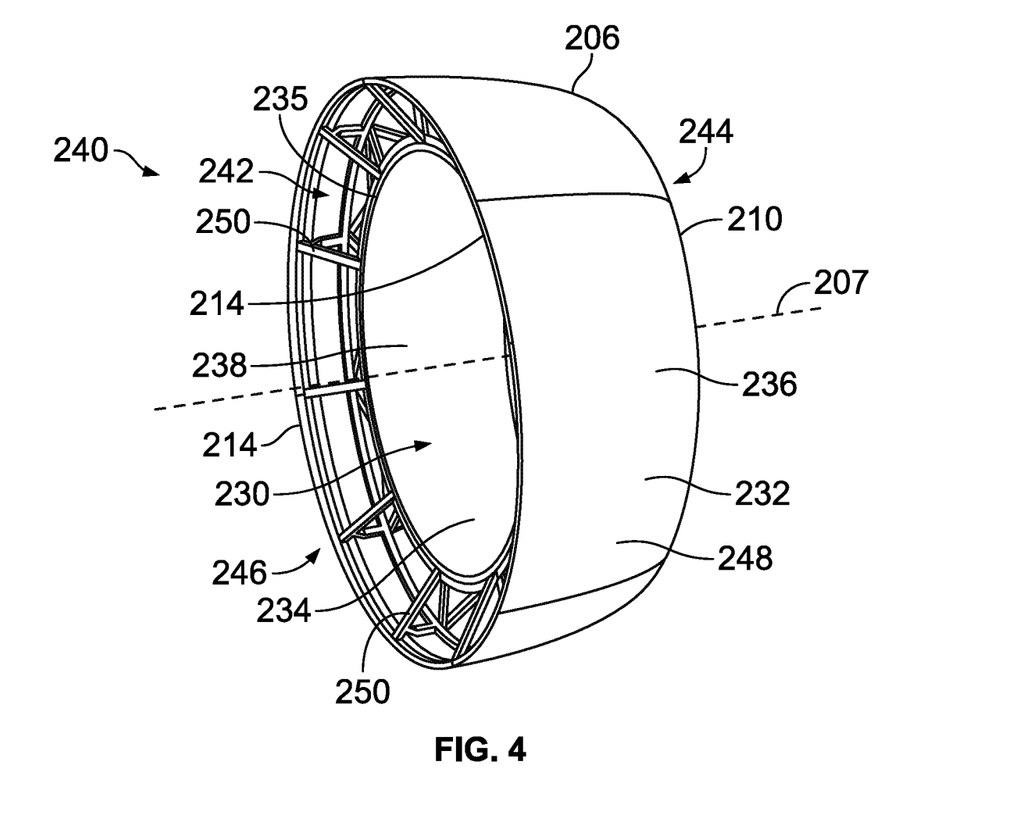
FIG. 4 is a perspective view of the inlet cowl shown in FIGS. 2 and 3, showing an aft edge thereof.

FIG. 3 is a front view of the inlet cowl 206 shown in FIG. 2. FIG. 4 is a perspective view of the inlet cowl 206 shown in FIGS. 2 and 3, showing the aft edge 214 of the inlet cowl 206. The inlet cowl 206 has an annular barrel shape that defines a central opening 230. The term "annular barrel shape" means that the inlet cowl 206 defines a closed, ring-like shape when viewed from the front. The inlet cowl 206 may have a generally cylindrical shape. For example, the leading edge 210 may be circular. The inlet cowl 206 directs air through the central opening 230 into the core 212 of the nacelle 200 shown in FIG. 2. The inlet cowl 206 has an outer barrel portion 232 radially outside of the leading edge 210 and an inner barrel portion 234 radially inside of the leading edge 210. The inner barrel portion 234 may define the central opening 230, and operates as an intake duct to supply air into the core 212 for the rotary components. As shown in FIGS. 3 and 4, the outer barrel portion 232 surrounds the inner barrel portion 234. The outer barrel portion 232 may be radially offset from the inner barrel portion 234 to define a cavity 242 within the inlet cowl 206. The cavity 242 is closed at a front end 244 of the inlet cowl 206, and open at a rear or aft end 246.

The inlet cowl 206 extends a length along a central longitudinal axis 207. The inlet cowl 206 includes a lipskin 236 and an acoustic panel 238. The lipskin 236 may define the leading edge 210 and the outer barrel portion 232. The acoustic panel 238 is coupled to the lipskin 236 along the inner barrel portion 234, and the acoustic panel 238 defines a length of the inner barrel portion 234. For example, the lipskin 236 may define a front section of the inner barrel portion 234 along the length of the inlet cowl 206, and the acoustic panel 238 may define an aft section of the inner barrel portion 234, which extends to an inner aft edge 235. As a part of the inlet cowl 206, the acoustic panel 238 is located forward of the fan cowl 208. The acoustic panel 238 may be located in relatively close proximity to one or more fans or other rotary equipment. The acoustic panel 238 may have a plurality of perforations for absorbing noise generated by the rotary equipment and/or the airflow passing through the inlet cowl 206.

As shown in FIG. 4, the inlet cowl 206, including the lipskin 236 and acoustic panel 238, may represent a portion of an inlet assembly 240. The inlet assembly 240 may include at least a portion of an anti-ice FIPS (shown in FIG. 6) integrated within the cavity 242 of the inlet cowl 206. The FIPS supplies an anti-ice fluid onto an exterior surface 248 of the inlet cowl 206 to prohibit ice formation on the exterior surface 248. The exterior surface 248 that receives the anti-ice fluid is at and around the leading edge 210. The exterior surface 248 is exposed to the elements, such as sunlight, moisture, debris, wind, birds, etc.

The inlet assembly 240 may include support frames 250 within the cavity 242 of the inlet cowl to mechanically support the lipskin 236 and the acoustic panel 238. The support frames 250 may help withstand pressure and other forces exerted on the exterior surface 248. One or more of the support frames 250 may be open truss-like structures that enable air flow through openings in the support frames 250. In an embodiment, the inlet assembly 240 may lack bulkheads that partition the cavity 242 into multiple channels or regions that are blocked off from each other (e.g., fluidly isolated from each other). Avoiding bulkheads which subdivide the cavity may reduce the complexity of manufacturing the inlet assembly 240 relative to conventional inlets.

Figure 5:
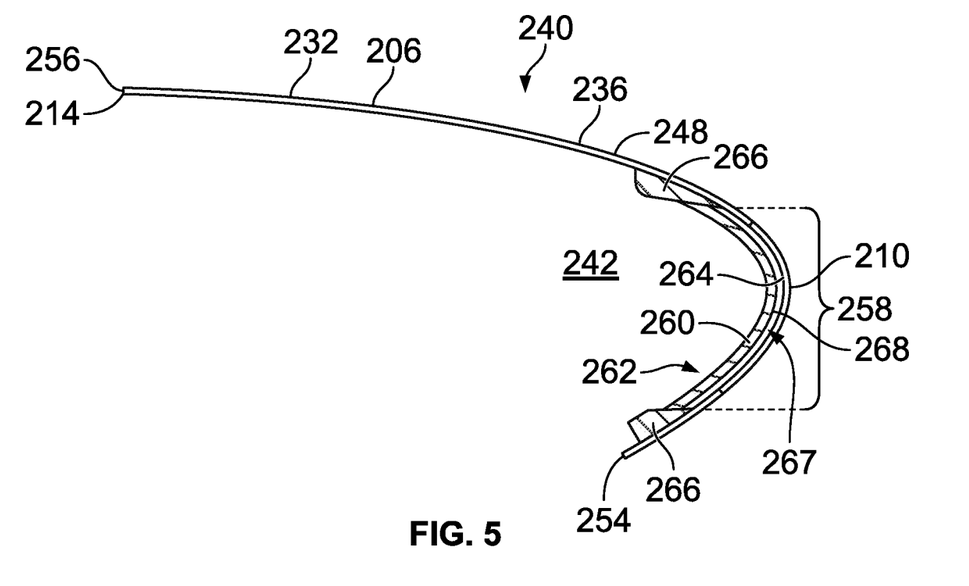
FIG. 5 is a cross-sectional view of a portion of an inlet assembly according to an embodiment.

FIG. 5 is a cross-sectional view of a portion of the inlet assembly 240 according to an embodiment. The illustrated portion shows the lipskin 236 of the inlet cowl 206 without the acoustic panel 238. For example, the acoustic panel 238 may couple to an inner edge 254 of the lipskin 236 during the assembly process. The lipskin 236 in the illustrated embodiment has a curved shape that radially and longitudinally extends forward from the inner edge 254 to the leading edge 210, and then rearward to an outer, aft edge 256 of the lipskin 236. The lipskin 236 may be relatively thin. The area of the lipskin 236 that includes the leading edge 210 and the areas immediately radially adjacent to the leading edge 210 is referred to herein as a front section 258 of the lipskin 236. The outer, aft edge 256 may define the aft edge 214 of the inlet cowl 206, such that the lipskin 236 extends the full length of the inlet cowl 206 along the outer barrel portion 232. As shown in FIG. 5, the exterior surface 248 of the inlet cowl 206 is smooth and defined by a single, continuous construct (e.g., the lipskin 236) along the entire length of the outer barrel portion 232. There are no seams, joints, or interfaces from the leading edge 210 to the aft edge 214, which promotes laminar air flow along the aerodynamic exterior surface 248, providing a substantial drag benefit. The inlet assembly 240 described herein may provide a longer and/or larger surface area along which the air flow is laminar, relative to the inlet size, than conventional inlets.

The inlet assembly 240 may include a plenum back wall 260 that is affixed to the inlet cowl 206. The plenum back wall 260 is a component of an anti-ice FIPS 262. The plenum back wall 260 is disposed within the cavity 242 of the inlet cowl 206 and extends along the front section 258 of the lipskin 236. The plenum back wall 260 may be bonded, directly or indirectly, to an interior surface 264 of the lipskin 236. In an embodiment, the lipskin 236 includes integrated protrusions 266 that serve as mounts on which to affix the plenum back wall 260. The protrusions 266 may be integral to the lipskin 236 and define sections of the interior surface 264. In an alternative embodiment, the protrusions 266 may be discrete components that are themselves mounted to the interior surface 264 and serve to indirectly secure the plenum back wall 260 to the lipskin 236. The plenum back wall 260 is mounted to the inlet cowl 206 to define a plenum 267 (e.g., fluid manifold) for receiving and containing the anti-ice liquid of the FIPS 262. The plenum 267 is defined between the interior surface 264 of the lipskin 236 and a front surface 268 of the back wall 260. The plenum 266 may be located along the front section 258 of the lipskin 236 only, such that the plenum 266 does not extend along the outer barrel portion 232.

Figure 6:
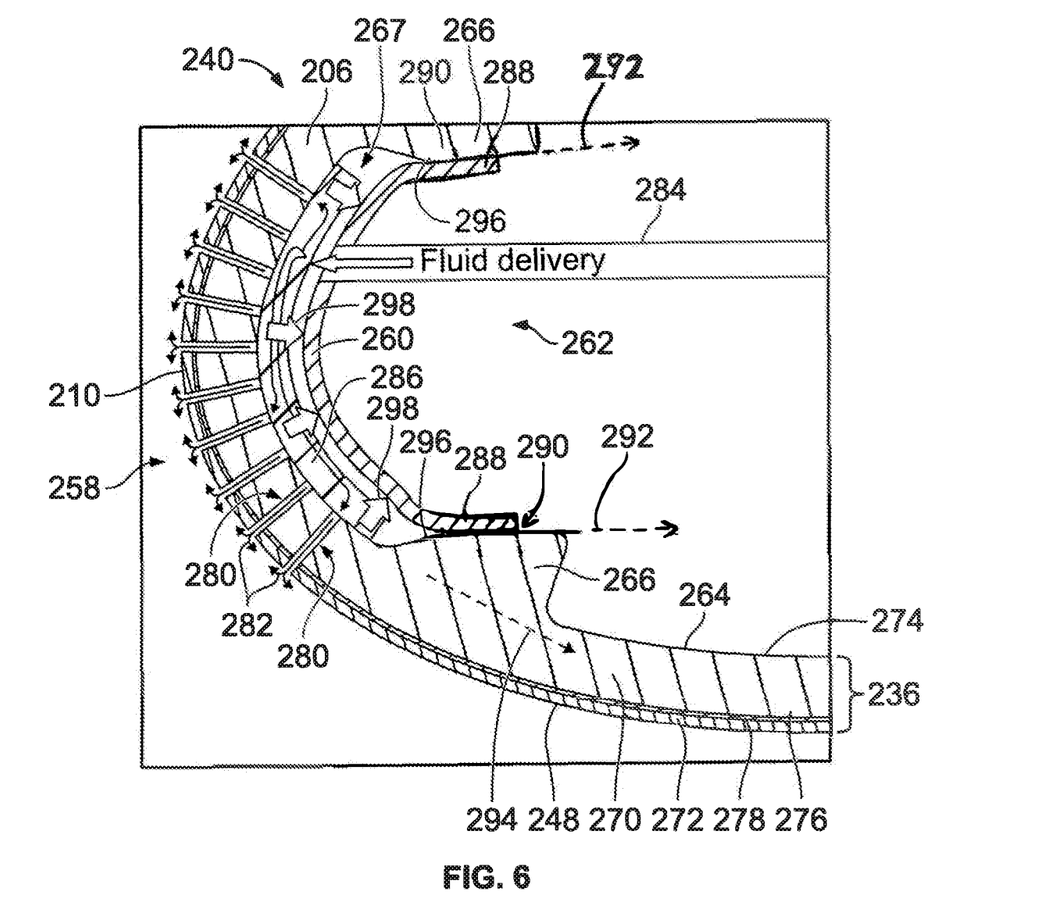
FIG. 6 illustrates an enlarged, schematic rendering of the inlet assembly at a leading edge according to an embodiment.

FIG. 6 illustrates an enlarged, schematic rendering of the inlet assembly 240 at the leading edge 210 according to an embodiment. The illustrated components in FIG. 6 are depicted for ease of description, and may not be drawn to scale and/or in the actual shapes as would be present in a prototype.

The lipskin 236 in an embodiment is a stack-up of multiple different layers. The lipskin 236 may include at least a composite panel 270 and a metallic coating 272. The metallic coating 272 is exterior of the composite panel 270 to provide an erosion shield that protects the composite panel 270 from leading edge damage. The metallic coating 272 may define the exterior surface 248 of the inlet cowl 206 along all of the surface area of the inlet cowl 206 that is exposed to the environmental elements. The composite panel 270 and metallic coating 272 may extend the full length of the lipskin 236.

The composite panel 270 has an interior surface 274 and an exterior surface 276 opposite the interior surface 274. The interior surface 274 may define the interior surface 264 of the lipskin 236. The metallic coating 272 is disposed along the exterior surface 276 of the composite panel 270. In an embodiment, the metallic coating 272 is indirectly connected to the exterior surface 276 via one or more intervening layers. The one or more intervening layers may include an electrically conductive layer 278 that is provided to assist with the application of the metallic coating 272 on the composite panel 270. The conductive layer 278 may be a metallic material that has a different composition than the metallic coating 272.

In an embodiment, the composite panel 270 is or includes carbon fiber. For example, the composite panel 270 may have a carbon fiber reinforced polymer (CFRP) material. The polymer may be a thermoplastic or the like. The metallic coating 272 may be a metal alloy. For example, the metallic coating 272 in an embodiment is a nickel-cobalt (NiCo) alloy. The metallic coating 272 may be deposited onto the lipskin 236 to solidify and harden. In an embodiment, the metallic coating 272 is applied via electroplating. For example, the metallic coating 272 may be a NiCo alloy that is electroplated onto the lipskin 236.

The lipskin 236 may define multiple perforations 280 that penetrate the thickness of the lipskin 236 along the front section 258. The perforations 280 may extend continuously through the composite panel 270, the conductive layer 278, and the metallic coating 272. The perforations 280 are aligned with and open to the plenum 267, such that the perforations 280 receive anti-ice liquid 282 from the plenum 267. The characteristics of the perforations 280 (e.g., diameter, location, percent-open-area, etc.) may be selected based on application-specific parameters. In an embodiment, the perforations 280 have micron scale diameters. The microscopic perforations 280 may be formed via a laser drilling technique. The tiny perforations 280 enable to the liquid 282 under pressure to slowly weep through the perforations 280 onto the exterior surface 248. The anti-ice liquid 282 may be a solution that provides freezing point depression. For example, the anti-ice liquid 282 may be an ethylene glycol-based solution.

The illustrated components of the FIPS 262 in the inlet assembly 240 may include the plenum back wall 260, a fluid delivery conduit 284 that is coupled to the plenum back wall 260, and one or more membranes 286. The conduit 284 may be a duct, tube, or the like that provides a path from a fluid reservoir to the plenum 267. The anti-ice liquid 282 may be pumped through the conduit 284 into the plenum 267 through an aperture in the back wall 260. The one or more membranes 286 are disposed within the plenum 267 (e.g., between the lipskin 236 and the back wall 260) and receive the anti-ice liquid 282. A single membrane 286 is shown in FIG. 6. The membrane 286 may be designed to absorb and distribute the anti-ice liquid 282 to the perforations 280. For example, the membrane 286 may extend across and cover all or a majority of the perforations 280. The membrane 286 may spread the liquid 282 along a length of the membrane 286 which supports a more uniform distribution of the liquid 282 among the perforations 280. The membrane 286 optionally may be a porous material, such as an open-celled foam material.

In an embodiment, the plenum back wall 260 includes first and second flanges 288 at respective ends of the back wall 260. The flanges 288 are secured to the protrusions 266 of the lipskin 236 along respective contact interfaces 290. The flanges 288 may be bonded to the protrusions 266 at the contact interfaces 290. The bonding may be accomplished via application of an adhesive, a heat treatment, and/or the like. In an embodiment, the contact interfaces 290 are angled transverse to the tangent of the interior surface 264 of the lipskin 236 proximate to the contact interfaces 290 to enhance retention of the plenum back wall 260 to the lipskin 236. The contact interfaces 290 extend along ramp surfaces 296 of the protrusions 266. The contact interfaces 290 have vectors 292 that are not parallel to the tangent 294 of the interior surface 262. The contact interfaces 290 are angled to shift the pressure loading dynamics along the bonded interfaces 290 and enable the plenum back wall 260 to withstand more force before separating from the lipskin 236, relative to bonding the back wall 260 to the lipskin 236 without the protrusions 266.

For example, the plenum 267 may experience pressure that tends to force the plenum back wall 260 away from the leading edge 210, as indicated by the force arrows 298. Furthermore, the composite panel 270 and the protrusions 266 are not metallic, so the plenum back wall 260 cannot be welded to the lipskin 236. In an embodiment, the protrusions 266 may be composed of a rigid, closed-cell foam. By bonding the flanges 288 to the protrusions 266 along the angled contact interfaces 290, the forces exerted on the back wall 260 are withstood by shear retention along the contact interfaces 290. For example, the forces on the back wall 260 may be acutely angled relative to the interface vectors 292, which is resisted in part by shear loading at the interfaces 290. Without the angled contact interfaces 290, the forces on the back wall 260 may peel the back wall 260 off the interior surface 264 of the lipskin 236, breaking the FIPS 262.

Figure 7:
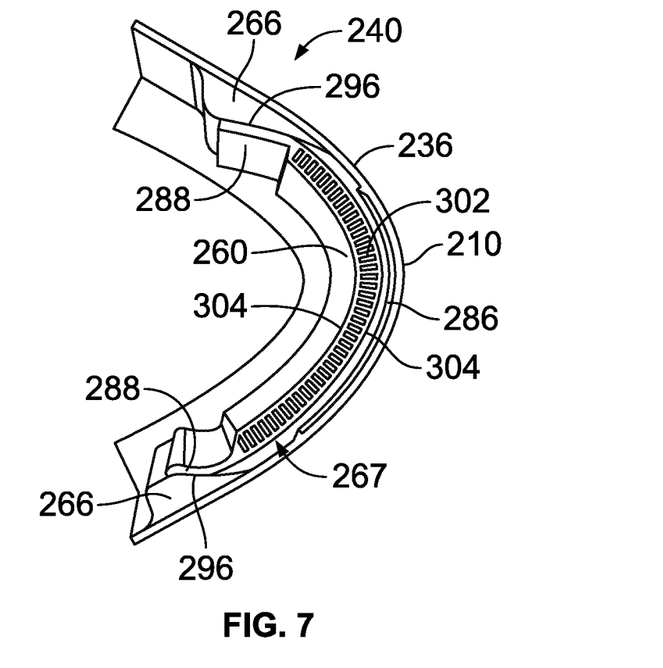
FIG. 7 is a cross-sectional view of a nose portion of the inlet assembly according to an embodiment.
Figure 8:
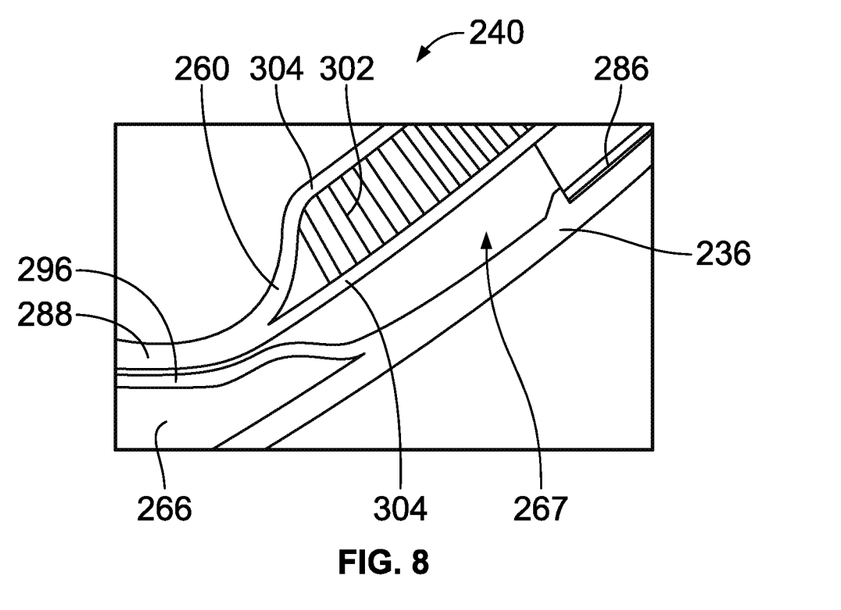
FIG. 8 is an enlarged view of a segment of the nose portion shown in FIG. 7.

FIG. 7 is a cross-sectional view of a nose portion of the inlet assembly 240 according to an embodiment. FIG. 8 is an enlarged view of a segment of the nose portion shown in FIG. 7. The views in FIGS. 7 and 8 may be more accurate in terms of scale and shapes of the components relative to the illustration in FIG. 6. FIG. 7 shows the leading edge 210 of the lipskin 236, the plenum back wall 260, the protrusions 266, and the membrane 286. With reference to both FIGS. 7 and 8, the thin membrane 286 is disposed within the plenum 267. The flanges 288 of the back wall 260 are secured to the ramp surfaces 296 of the protrusions 266, as described with reference to FIG. 6. In an embodiment, the plenum back wall 260 may be a composite structure. For example, the back wall 260 may include a core layer 302 sandwiched between two outer layers 304. The core layer 302 may be a honeycomb structure. In an embodiment, the protrusions 266 may include a rigid, closed-cell foam material. The protrusions 266 may be integrated onto the lipskin 236, such as formed with the composite panel 270.

Figure 9:
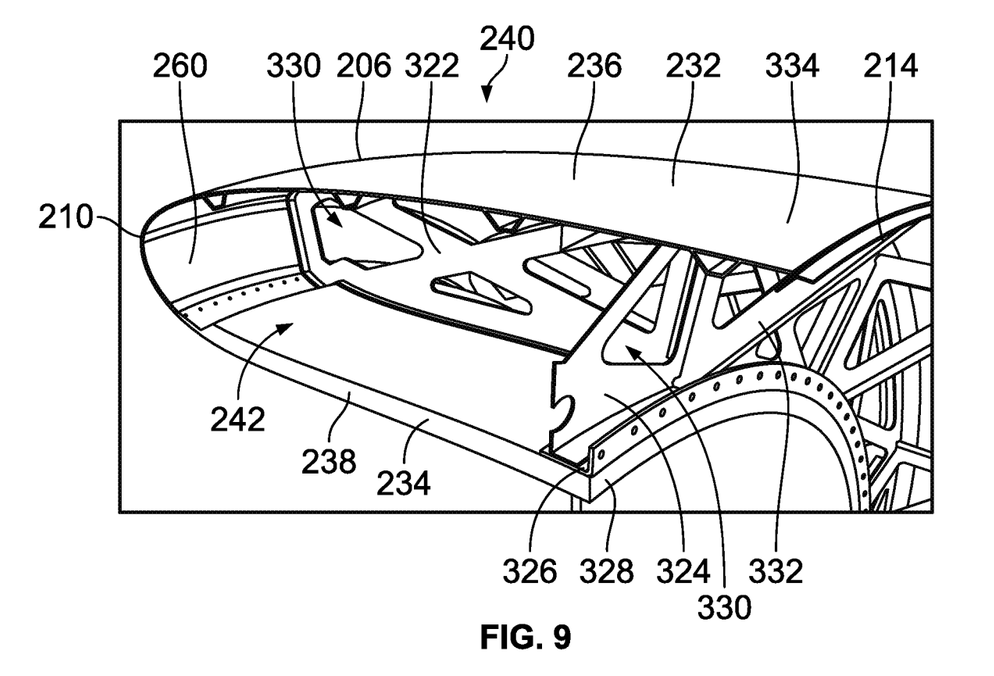
FIG. 9 is a cross-sectional view of a portion of the inlet assembly according to an embodiment.

FIG. 9 is a cross-sectional view of a portion of the inlet assembly 240 according to an embodiment. FIG. 9 shows the acoustic panel 238 longitudinally extending along the inner barrel portion 234, and the lipskin 236 longitudinally extending the length of the outer barrel portion 232. The plenum back wall 260 is disposed at the front end of the cavity 242, interior of the leading edge 210. The inlet assembly 240 may include support frames within the cavity 242 to mechanically support the extended length of the lipskin 236 and withstand forces exerted on the lipskin 236 to maintain the shape of the inlet cowl 206.

In an embodiment, the support frames include longitudinally extending support frames 322 that are circumferentially spaced apart. The support frames may also include circumferentially extending support frames 324. The circumferentially extending support frames 324 may be located proximate to the aft edge 214 of the inlet cowl 206. For example, the support frames 324 may be coupled to a flange 326 mounted to an aft edge 328 of the acoustic panel 238. The support frames 324 may be perpendicular to the support frames 322. The support frames 322, 324 may all extend from the outer barrel portion 232 to the inner barrel portion 234. In an embodiment, the support frames 322, 324 are open, truss-like structures that permit fluid flow through openings 330 in the frames 322, 324. The support frames 322, 324 may be rearward or aft of the plenum back wall 260.

Optionally, the outer barrel portion 232 may extend aft beyond the aft edge 328 of the acoustic panel 238. The inlet assembly 240 may include one or more triangular support frames 332 to support the overhanging, cantilevered portion 334 of the outer barrel portion 232.

Figure 10:
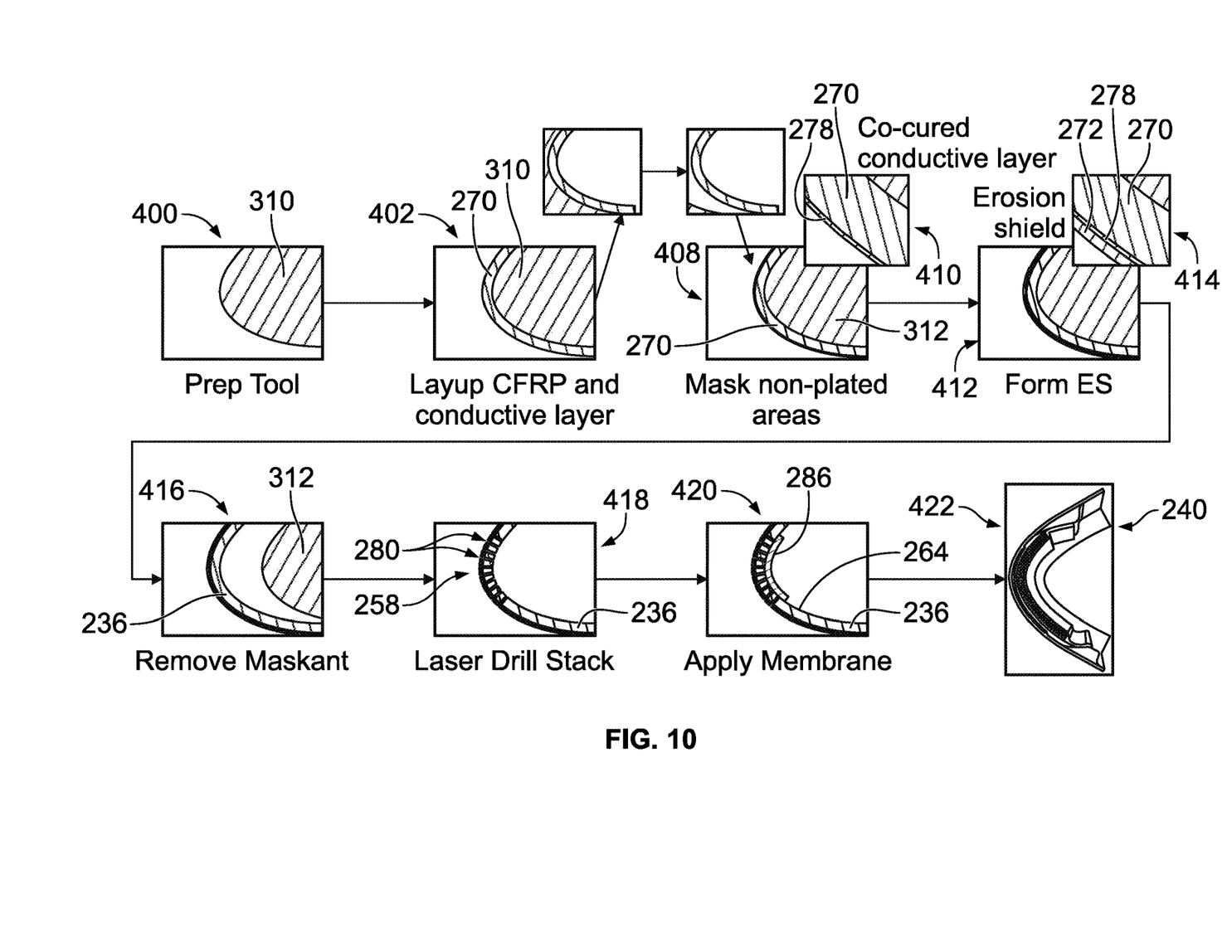
FIG. 10 is a schematic diagram depicting a process of assembling an inlet assembly according to an embodiment.

FIG. 10 is a schematic diagram depicting a process of assembling an inlet assembly according to an embodiment. The inlet assembly manufactured by the process may be the inlet assembly 240 shown in FIGS. 4 through 9. At box 400, a curved tool 310 is prepped for a layup process. The curved tool 310 may be a mold or mandrel. The tool 310 may have a shape that corresponds to a desired shape of the inlet cowl. At box 402, a carbon fiber reinforced polymer (CFRP) material is applied on the curved tool 310 to form the composite panel 270 via a layup process. The layup process may be an automated fiber placement (AFP) process in which multiple layers of fiber-reinforced material are applied on the tool 310. The layers may be tows or bundles of carbon fibers impregnated with an epoxy resin. The tows may be applied in different orientations relative to one another. Although not shown, the protrusions 266 of the lipskin 236 may be formed during the layup step shown in box 402.

The composite panel 270 may then be cured via a heat treatment and removed from the tool 310. Optionally, the conductive layer 278 may be applied to the exterior surface 276 of the composite panel 270. At box 408, non-plated areas of the composite panel 270 are masked by a maskant 312. The conductive layer 278, if present, may be co-cured at box 410.

At box 412, the metallic coating 272 is applied on the composite panel 270 (and conductive layer 278) by electroplating. The metallic coating 272 is shown in the inset enlarged view in box 414. At box 416, the maskant is removed from the structure, yielding the lipskin 236 (or stack). At box 418, the lipskin 236 is laser drilled to form perforations 280 through the thickness thereof in the front section 258. At box 420, the membrane 286 is applied along the interior surface 264 of the lipskin 236 to cover the perforations 280.

Box 422 shows a portion of the completed inlet assembly 240, similar to the view in FIG. 7. The assembly process may include additional steps not depicted in FIG. 10, such as bonding the plenum back wall 260 to the composite panel 270 and connecting the fluid delivery conduit 284 to the plenum back wall 260. Additional portions of the FIPS 262 may need to be assembled before the FIPS 262 is operational.

Figure 11:
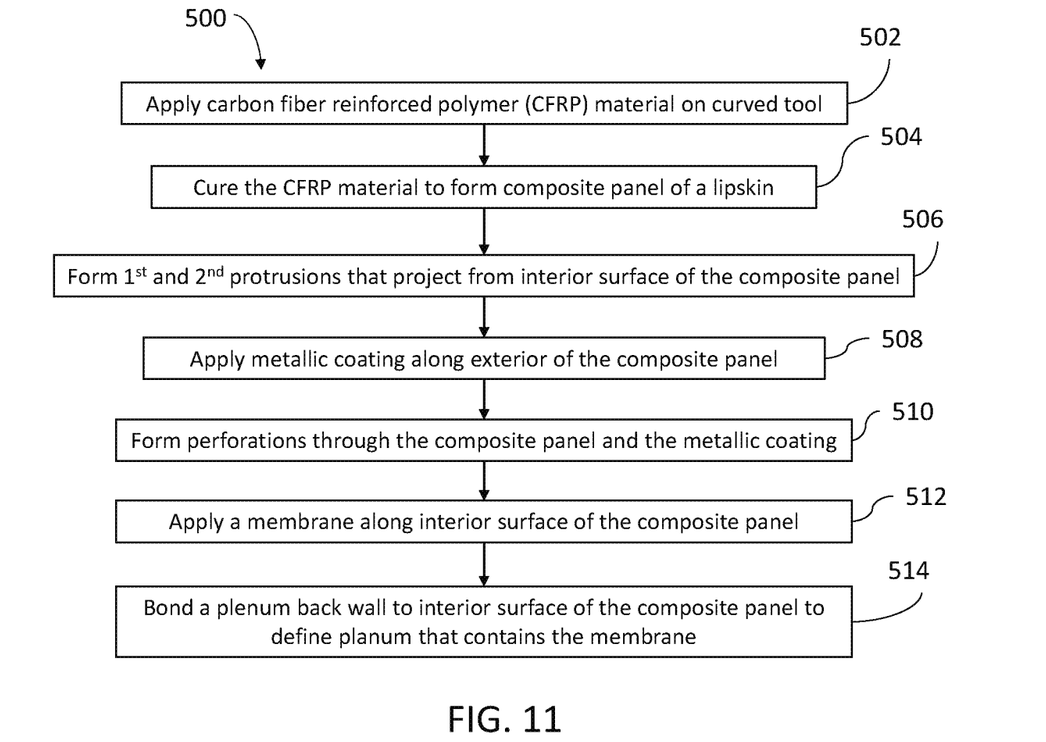
FIG. 11 is a flow chart for a method of forming an inlet cowl of a nacelle inlet assembly according to an embodiment.

FIG. 11 is a flow chart 500 for a method of forming an inlet cowl of a nacelle inlet assembly according to an embodiment. The method may be performed to form the inlet cowl 206 shown in FIG. 2. The method optionally may include at least one additional step than shown, at least one fewer step than shown, and/or at least one different step than shown in FIG. 11. The inlet cowl 206 is formed to include a leading edge 210 and an outer barrel portion 232, where the outer barrel portion extends to an aft edge 214 of the inlet cowl 206. At step 502, a carbon fiber reinforced polymer (CFRP) material is applied on a curved tool 310. At step 504, the CFRP material is cured to form a composite panel 270 of a lipskin 236. The lipskin 236 includes a front section 258 that defines the leading edge 210 of the inlet cowl 206. At step 506, first and second protrusions 266 are formed that project from the interior surface 274 of the composite panel 270.

At step 508, a metallic coating 272 is applied along an exterior surface 276 of the composite panel 270 to protect the composite panel 270 from damage. Applying the metallic coating 272 may include electroplating the metallic coating 272 along the composite panel 270. In an embodiment, the CFRP material is applied and cured, and the metallic coating 272 is applied such that the composite panel 270 and the metallic coating 272 of the lipskin 236 extend from the leading edge 210 to the aft edge 214 of the outer barrel portion 232.

At step 510, perforations 280 are formed that continuously extend through both the composite panel 270 and the metallic coating 272. The perforations 280 may be located along the front section 258 of the lipskin 236 and configured to deliver a liquid through a thickness of the lipskin 236 onto an exterior surface 248 of the inlet cowl 206. The perforations 280 may be formed by laser drilling the perforations to have micron scale diameters. At step 512, a membrane 286 may be applied along the interior surface 274 of the composite panel 270 along the front section 258. The membrane 286 may distribute the liquid among the perforations 280.

At step 514, a plenum back wall 260 is bonded to the interior surface 274 of the composite panel 270 along the front section 258 to define a plenum 267 between the interior surface 274 and a front surface 268 of the plenum back wall 260. For example, ramp surfaces 296 of the first and second protrusions 266 of the composite panel 270 may be bonded to first and second flanges 288, respectively, of the plenum back wall 260. The membrane 286 may be contained within the plenum 267 when the plenum back wall 260 is bonded to the composite panel 270.

Further, the disclosure comprises examples according to the following clauses:

Clause 1. An inlet assembly of a nacelle, the inlet assembly comprising:
an inlet cowl comprising:
a lipskin that includes a front section that defines a leading edge of the inlet cowl, the front section including a composite panel and a metallic coating disposed along an exterior surface of the composite panel to protect the composite panel from damage, the lipskin defining perforations that penetrate through the composite panel and the metallic coating at the front section to convey a liquid through a thickness of the lipskin onto an exterior surface of the inlet cowl.

Clause 2. The inlet assembly of Clause 1, wherein the composite panel includes a carbon fiber reinforced polymer (CFRP) material.

Clause 3. The inlet assembly of Clause 1 or Clause 2, wherein the metallic coating includes a nickel cobalt alloy.

Clause 4. The inlet assembly of any of Clauses 1-3, wherein the composite panel and the metallic coating of the lipskin define an outer barrel portion of the inlet cowl and extend a full length of the inlet cowl from the leading edge to an aft edge of the inlet cowl.

Clause 5. The inlet assembly of any of Clauses 1-4, wherein an electrically conductive layer is sandwiched between the composite panel and the metallic coating.

Clause 6. The inlet assembly of any of Clauses 1-5, wherein the inlet cowl defines a cavity between the leading edge, an inner barrel portion of the inlet cowl, and an outer barrel portion of the inlet cowl, and the inlet cowl lacks a bulkhead that fluidly separates two portions of the cavity.

Clause 7. The inlet assembly of Clause 6, further comprising one or more circumferentially extending support frames within the cavity, wherein the circumferentially extending support frames define openings to permit fluid flow therethrough.

Clause 8. The inlet assembly of Clause 6 or Clause 7, further comprising one or more longitudinally extending support frames within the cavity, wherein the longitudinally extending support frames define openings to permit fluid flow therethrough.

Clause 9. The inlet assembly of any of Clauses 1-8, further comprising a plenum back wall affixed to an interior surface of the lipskin along the front section to define a plenum between the interior surface and a front surface of the plenum back wall, wherein the liquid conveyed through the perforations is an anti-ice liquid that is supplied to the plenum.

Clause 10. The inlet assembly of Clause 9, further comprising a membrane within the plenum and covering the perforations, the membrane configured to distribute the anti-ice liquid among the perforations.

Clause 11. The inlet assembly of Clause 9 or Clause 10, wherein the lipskin includes first and second protrusions that project from the interior surface of the lipskin, and the plenum back wall includes first and second flanges that are each bonded to a ramp surface of a respective one of the protrusions to affix the plenum back wall to the lipskin.

Clause 12. The inlet assembly of Clause 11, wherein the first and second protrusions include a foam material and are integrated with the composite panel of the lipskin.

Clause 13. A method for providing an inlet assembly of a nacelle, the method comprising:
forming an inlet cowl that includes a leading edge, the inlet cowl forming step comprising: applying a carbon fiber reinforced polymer (CFRP) material on a curved tool;
curing the CFRP material to form a composite panel of a lipskin, the lipskin including a front section that defines the leading edge of the inlet cowl;
applying a metallic coating along an exterior surface of the composite panel to protect the composite panel from damage; and
forming perforations that continuously extend through both the composite panel and the metallic coating, the perforations located along the front section of the lipskin and configured to deliver a liquid through a thickness of the lipskin onto an exterior surface of the inlet cowl.

Clause 14. The method of Clause 13, wherein applying the metallic coating comprises electroplating the metallic coating along the composite panel.

Clause 15. The method of Clause 13 or Clause 14, wherein forming the perforations comprises laser drilling the perforations to have micron scale diameters.

Clause 16. The method of any of Clauses 13-15, further comprising bonding a plenum back wall to an interior surface of the composite panel along the front section to define a plenum between the interior surface and a front surface of the plenum back wall.

Clause 17. The method of Clause 16, wherein applying the CFRP material further comprises forming first and second protrusions that project from the interior surface of the composite panel, and the plenum back wall is bonded to the composite panel by bonding first and second flanges of the plenum back wall to respective ramp surfaces of the first and second protrusions.

Clause 18. The method of Clause 16 or Clause 17, further comprising applying a membrane along the interior surface of the composite panel prior to bonding the plenum back wall such that the membrane is contained within the plenum when the plenum back wall is bonded to the composite panel, the membrane configured to distribute the liquid among the perforations.

Clause 19. The method of any of Clauses 13-18, wherein the inlet cowl is formed to have an outer barrel portion that extends to an aft edge of the inlet cowl, wherein the CFRP material is applied and cured and the metallic coating is applied such that the composite panel and the metallic coating of the lipskin extend from the leading edge to the aft edge of the outer barrel portion.

Clause 20. An inlet assembly of a nacelle, the inlet assembly comprising:
an inlet cowl including a leading edge, an inner barrel portion, and an outer barrel portion, the inlet cowl comprising:
a lipskin that includes a front section that defines the leading edge of the inlet cowl, the front section including a composite panel and a metallic coating disposed along an exterior surface of the composite panel to protect the composite panel from damage, the lipskin defining perforations that penetrate through the composite panel and the metallic coating at the front section to convey a liquid through a thickness of the lipskin onto an exterior surface of the inlet cowl; and an acoustic panel coupled to the lipskin and extending along the inner barrel portion; and
a fluid ice protection system (FIPS), the FIPS including a plenum back wall affixed to an interior surface of the composite panel along the front section to define a plenum between the interior surface and a front surface of the plenum back wall, the FIPS including a fluid delivery conduit coupled to the plenum back wall and configured to supply an anti-ice liquid into the plenum through an aperture in the plenum back wall for the anti-ice liquid in the plenum to penetrate through the perforations onto an exterior surface of the inlet cowl.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An inlet assembly of a nacelle, the inlet assembly comprising:
   an inlet cowl comprising:
      a lipskin that includes a front section that defines a leading edge of the inlet cowl, the front section including a composite panel and a metallic coating that defines an exterior surface of the lipskin to protect the composite panel from damage, the lipskin defining perforations that penetrate through the composite panel and the metallic coating at the front section, the lipskin including a first protrusion and a second protrusion that project from an interior surface of the lipskin; and
      a plenum back wall affixed to the first and second protrusions to define a plenum at the front section that is open to the perforations, wherein a thickness of the plenum is defined between the interior surface of the lipskin and the plenum back wall and a length of the plenum is defined between the first and second protrusions, wherein the plenum is configured to receive an anti-ice liquid therein and the perforations are configured to convey the anti-ice liquid through a thickness of the lipskin onto the exterior surface of the lipskin.

2. The inlet assembly of claim 1, wherein the composite panel includes a carbon fiber reinforced polymer (CFRP) material.

3. The inlet assembly of claim 1, wherein the metallic coating includes a nickel cobalt alloy.

4. The inlet assembly of claim 1, wherein the composite panel and the metallic coating of the lipskin define an outer barrel portion of the inlet cowl and extend a full length of the inlet cowl from the leading edge to an aft edge of the inlet cowl.

5. The inlet assembly of claim 1, wherein an electrically conductive layer is sandwiched between the composite panel and the metallic coating.

6. The inlet assembly of claim 1, wherein the inlet cowl defines a cavity between the leading edge, an inner barrel portion of the inlet cowl, and an outer barrel portion of the inlet cowl, and the inlet cowl lacks a bulkhead that fluidly separates two portions of the cavity.

7. The inlet assembly of claim 6, further comprising one or more circumferentially extending support frames within the cavity, wherein the circumferentially extending support frames define openings to permit fluid flow therethrough.

8. The inlet assembly of claim 6, further comprising one or more longitudinally extending support frames within the cavity, wherein the longitudinally extending support frames define openings to permit fluid flow therethrough.

9. The inlet assembly of claim 1, further comprising a membrane fully contained within the plenum between the interior surface of the lipskin and the plenum back wall and covering the perforations, the membrane configured to distribute the anti-ice liquid among the perforations.

10. The inlet assembly of claim 9, wherein the membrane is designed to absorb the anti-ice liquid to distribute the anti-ice liquid along a length of the membrane within the plenum.

11. The inlet assembly of claim 1, wherein the plenum back wall includes a first flange that is bonded to a first ramp surface of the first protrusion and a second flange that is bonded to a second ramp surface of the second protrusion to affix the plenum back wall to the lipskin, wherein contact interfaces at the first and second ramp surfaces have respective vectors that are not parallel to tangent lines of the lipskin proximate to the first and second ramp surfaces.

12. The inlet assembly of claim 1, wherein the first and second protrusions include a foam material and are integrated with the composite panel of the lipskin.

13. The inlet assembly of claim 1, wherein the first and second protrusions comprise a rigid, closed-cell foam.

14. A method for providing an inlet assembly of a nacelle, the method comprising:
   forming an inlet cowl that includes a leading edge, the inlet cowl forming step comprising:
      curing a carbon fiber reinforced polymer (CFRP) material to form a composite panel of a lipskin, the lipskin including a front section that defines the leading edge of the inlet cowl, the lipskin including a first protrusion and a second protrusion that project from an interior surface of the lipskin;

applying a metallic coating to define an exterior surface of the lipskin to protect the composite panel from damage; and forming perforations that continuously extend through both the composite panel and the metallic coating, the perforations located along the front section of the lipskin and configured to deliver a liquid through a thickness of the lipskin onto an exterior surface of the inlet cowl;

affixing a plenum back wall to the first and second protrusions to define a plenum at the front section that is open to the perforations, wherein a thickness of the plenum is defined between the interior surface of the lipskin and the plenum back wall and a length of the plenum is defined between the first and second protrusions, wherein the plenum is configured to receive an anti-ice liquid therein and the perforations are configured to convey the anti-ice liquid through a thickness of the lipskin onto the exterior surface of the lipskin.

15. The method of claim 14, wherein applying the metallic coating comprises electroplating the metallic coating along the composite panel.

16. The method of claim 14, wherein forming the perforations comprises laser drilling the perforations to have micron scale diameters.

17. The method of claim 14, wherein affixing the plenum back wall to the first and second protrusions comprises bonding first and second flanges of the plenum back wall to respective ramp surfaces of the first and second protrusions.

18. The method of claim 14, further comprising applying a membrane along the interior surface of the composite panel prior to bonding the plenum back wall such that the membrane is fully contained within the plenum between the interior surface of the lipskin and the plenum back wall when the plenum back wall is affixed to the first and second protrusions, the membrane configured to distribute the liquid among the perforations.

19. The method of claim 14, wherein the inlet cowl is formed to have an outer barrel portion that extends to an aft edge of the inlet cowl, wherein the CFRP material is applied and cured and the metallic coating is applied such that the composite panel and the metallic coating of the lipskin extend from the leading edge to the aft edge of the outer barrel portion.

20. An inlet assembly of a nacelle, the inlet assembly comprising:

an inlet cowl including a leading edge, an inner barrel portion, and an outer barrel portion, the inlet cowl comprising:
  a lipskin that includes a front section that defines the leading edge of the inlet cowl, the front section including a composite panel and a metallic coating that defines an exterior surface of the lipskin to protect the composite panel from damage, the lipskin defining perforations that penetrate through the composite panel and the metallic coating at the front section, the lipskin including a first protrusion and a second protrusion that project from an interior surface of the lipskin; and
an acoustic panel coupled to the lipskin and extending along the inner barrel portion; and
a fluid ice protection system (FIPS), the FIPS including a plenum back wall affixed to the first and second protrusions to define a plenum at the front section that is open to the perforations, wherein a thickness of the plenum is defined between the interior surface of the lipskin and a front surface of the plenum back wall, and a length of the plenum is defined between the first and second protrusions, the FIPS including a fluid delivery conduit coupled to the plenum back wall and configured to supply an anti-ice liquid into the plenum through an aperture in the plenum back wall for the anti-ice liquid in the plenum to penetrate through the perforations onto the exterior surface of the lipskin.

* * * * *